United States Patent [19]
Deolaliker

[11] Patent Number: 5,872,729
[45] Date of Patent: Feb. 16, 1999

[54] ACCUMULATION BUFFER METHOD AND APPARATUS FOR GRAPHICAL IMAGE PROCESSING

[75] Inventor: Vikas S. Deolaliker, Chicago, Ill.

[73] Assignee: Sun Microsystems, Inc., Palo Alto, Calif.

[21] Appl. No.: 563,158

[22] Filed: Nov. 27, 1995

[51] Int. Cl.$^6$ .................................. G06F 7/38; G06F 7/00
[52] U.S. Cl. .................................. 364/736.02; 364/750.5
[58] Field of Search ........................... 364/736, 754, 364/757, 758, 759, 70, 750.5, 736.02

[56] References Cited

U.S. PATENT DOCUMENTS 4,809,212   2/1989   New et al. ........................... 364/757
5,444,835   8/1995   Turkowski .

FOREIGN PATENT DOCUMENTS 7-319669   12/1995   Japan ........................... G06F 7/50

OTHER PUBLICATIONS

"MC88110 Second Generation RISC Microprocessor User's Manual" Motorola Inc, 1991, pp. 1–1 – 1–24, 5–1 – 5–26.
SPARC Technology Business, UltaSPARC UltraSPARC Multimedia Capabililites On–Chip Support for Real–Time Video and Advanced Graphics, Sep. 1994, pp. 1–8.

"Accumulation Buffer," *Solaris XGL 3.0.1 Programmer's Guide*, Sun Microsystems, Inc., May 21, 1993, pp. 174–177.

*Primary Examiner*—Chuong Dinh Ngo
*Attorney, Agent, or Firm*—James D. Ivey

[57] ABSTRACT

Various components of a color pixel stored in an accumulation buffer and respective components of a color pixel in a frame buffer are processed substantially simultaneously in partitioned multiplication operations and partitioned addition operations. An accumulation buffer weight is substantially multiplied by each component of the buffer pixel substantially simultaneously in a partitioned multiplication operation. The weighted buffer pixel is adjusted in some embodiments to effectively increase the range of accumulation buffer weights which can be effectively processed by the processor. For example, the weighted buffer pixel is doubled to effectively extend the effective range of the accumulation buffer weight from approximately –0.5 to 0.5 to at least the range of approximately 0.0 to approximately 1.0. A separate load and store unit of the processor retrieves from the frame buffer and from the accumulation buffer a next frame pixel and a next accumulation buffer pixel, respectively, for subsequent processing in an arithmetic processing unit of the processor while the arithmetic processing unit substantially simultaneously processes a previously retrieved frame pixel and accumulation buffer pixel.

16 Claims, 11 Drawing Sheets

ACCUMULATION BUFFER METHOD AND APPARATUS FOR GRAPHICAL IMAGE PROCESSING

FIELD OF THE INVENTION

The present invention relates to graphical image processing in a computer system and, in particular, to a particularly efficient accumulation mechanism implemented in a computer having a processor capable of performing multiple arithmetic operations simultaneously and in parallel.

BACKGROUND OF THE INVENTION

Accumulation buffers are used in graphical image processing to accomplish a number of effects, including anti-aliasing, motion blur, enhanced depth perception, and soft shading. In general, an accumulation buffer is used to combine multiple frames to produce a composite frame. Each of the multiple frames is typically combined with the accumulation buffer by calculating, for each pixel of the frame, a weighted average of the pixel with a corresponding pixel of the accumulation buffer. Each of the above-listed effects are achieved by altering a single graphical image slightly to produce a number of slightly different frames and accumulating the frames in the accumulation buffer.

Aliasing refers to jagged edges on graphical objects represented in a rasterized image. For example, a line which is slanted, i.e., neither fully horizontal nor fully vertical, appears to be jagged when displayed in a rectangular grid of pixels of a computer display device. The jagged quality is a result of rounding floating point values to integer pixel addresses. Anti-aliasing generally refers to graphical alteration of a graphical object or image to remove the appearance of jagged edges. An accumulation buffer is used to produced an anti-aliased image by "jittering" the image. In other words, the graphical image is rendered into the accumulation buffer. Then the graphical image is translated, i.e., moved, by a fraction of a pixel and is rendered again to produce a slightly translated frame. Rendering the graphical image as translated causes the jags in the various edges of the various graphical objects rendered to appear in slightly different places. The slightly translated frame is then accumulated with the previously rendered frame in the accumulation buffer and the resulting frame is stored in the accumulation buffer. The translation, rendering and accumulation of frames of the graphical image is repeated a number of times, e.g., 60 times. The result is an averaging of a number of frames in which jags in the edges of graphical objects in a graphical image are smoothed, providing the appearance of smooth edges.

An accumulation buffer is used in a similar fashion to blur graphical objects in motion. In computer generated animation, objects in motion often have no blur, i.e., appear to have very sharp edges. When an object with sharp edges moves quickly across a television or movie screen or across a computer display device in a motion video display, the appearance is very unnatural and disturbing to the viewer. To achieve a more natural blurring of the object in motion, a graphical image in which an object is in motion is repeatedly rendered with the object in different position along the path of motion of the object and the resulting frames are accumulated in the accumulation buffer. The resulting accumulated frame includes an image of the moving graphical object which is blurred along the path of motion of the graphical object and a considerably more natural and pleasing animated video display.

An accumulation buffer is also used to enhance depth perception in a three-dimensional graphical image. Depth perception is enhanced by blurring graphical objects distant from the viewer while preserving sharpness in graphical objects nearer the viewer. This result is achieved by repeatedly rendering the three-dimensional image from slightly varying perspectives. Altering the perspective of a three-dimensional graphical image results in greater movement of graphical object further from the viewer relative to movement of objects nearer the viewer. Accumulation of frames corresponding to slightly varied perspectives therefore results in blurring of graphical objects substantially proportional to the distance of the graphical objects from the viewer. Thus, depth perception in the rendered and accumulated graphical image is enhanced substantially.

An accumulation buffer is further used to soften shadows in a rendered graphical image. Because of the precision of computers in rendering three-dimensional graphical images, shadows portrayed in such rendered graphical images are particularly sharp, resulting in an unnatural, surreal appearance of the graphical image. Shadows in such a graphical image are softened by repeatedly rendering the graphical image with the respective positions of various virtual light sources, which define the lighting characteristics of the graphical image, varied slightly and the resulting frames are accumulated in the accumulation buffer. Since each frame corresponds to a slightly different light source position, shadows in each frame are in a slightly different position. The accumulated frame in the accumulation buffer therefore has softer shadows, as if from a more diffused light source. The resulting displayed graphical image is more natural and realistic.

It is common for a graphical image to be as large as a rectangular grid of one thousand rows by one thousand columns of pixels. Such a graphical image has one million pixels. If the graphical image is in color, each pixel has four components, namely, red, green, blue, and alpha. To accumulate each component of a single pixel of a graphical image with a pixel stored in the accumulation buffer typically requires two memory read operations, two multiplication operations, one addition operation, and one memory store operation. Reading the four components of a color pixel typically requires a single read of a 32-bit word from memory and execution of approximately eleven computer instructions to parse each eight-bit component from the 32-bit word. To accumulate a single graphical image having four components per pixel and one million pixels therefore requires two million read operations, execution of twenty-two million parsing computer instructions, eight million multiplication operations, four million addition operations, and four million store operations.

It is common to accumulate as many as 60 frames to produce a single anti-aliased color graphical image, requiring 120 million read operations, execution of 1.32 billion parsing computer instructions, 480 million multiplication operations, 240 million addition operations, and 240 million store operations. Image processing using accumulation buffers therefore requires substantial computer resources. Accordingly, ever increasing efficiency in accumulation buffer mechanisms for use in image processing persists as a need in the industry.

SUMMARY OF THE INVENTION

In accordance with the present invention, efficiency in accumulating pixel data in an accumulation buffer is significantly improved by processing various components of a color pixel stored in an accumulation buffer and respective components of a color pixel in a frame buffer substantially simultaneously in partitioned multiplication operations and partitioned addition operations. An accumulation buffer weight is substantially multiplied by each component of the buffer pixel substantially simultaneously in a partitioned multiplication operation. In one embodiment, the partitioned operations include (i) a first partitioned multiplication operation in which a most significant portion of the accumulation buffer weight is multiplied by each component of the buffer pixel to form a first partially weighted buffer pixel, (ii) a second partitioned multiplication operation in which a least significant portion is multiplied by each component of the buffer pixel to form a second partially weighted buffer pixel, and (iii) a partitioned addition operation in which the first and second partially weighted buffer pixels are summed to produce a weighted buffer pixel.

Because of limitations in precision with which some processors can perform partitioned multiplication operations, the weighted buffer pixel is adjusted in some embodiments to effectively increase the range of accumulation buffer weights which can be effectively processed by the processor. For example, in one embodiment, the processor can process accumulation buffer weights in the range of approximately −0.5 to 0.5 and the weighted buffer pixel is doubled to extend the effective range of the accumulation buffer weight to at least the range of approximately 0.0 to approximately 1.0.

To further improve efficiency with which frame pixels are accumulated with accumulation buffer pixels, a separate load and store unit of the processor retrieves from the frame buffer and from the accumulation buffer a next frame pixel and a next accumulation buffer pixel, respectively, for subsequent processing in an arithmetic processing unit of the processor while the arithmetic processing unit substantially simultaneously processes a previously retrieved frame pixel and accumulation buffer pixel.

In accordance with one embodiment of the present invention, the number of instruction cycles required to accumulation a single frame pixel with a single accumulation buffer pixel is reduced from approximately 24 to approximately four instruction cycles. The present invention therefore represents a significant improvement over conventional accumulation techniques and mechanisms.

DETAILED DESCRIPTION

Figure 1:
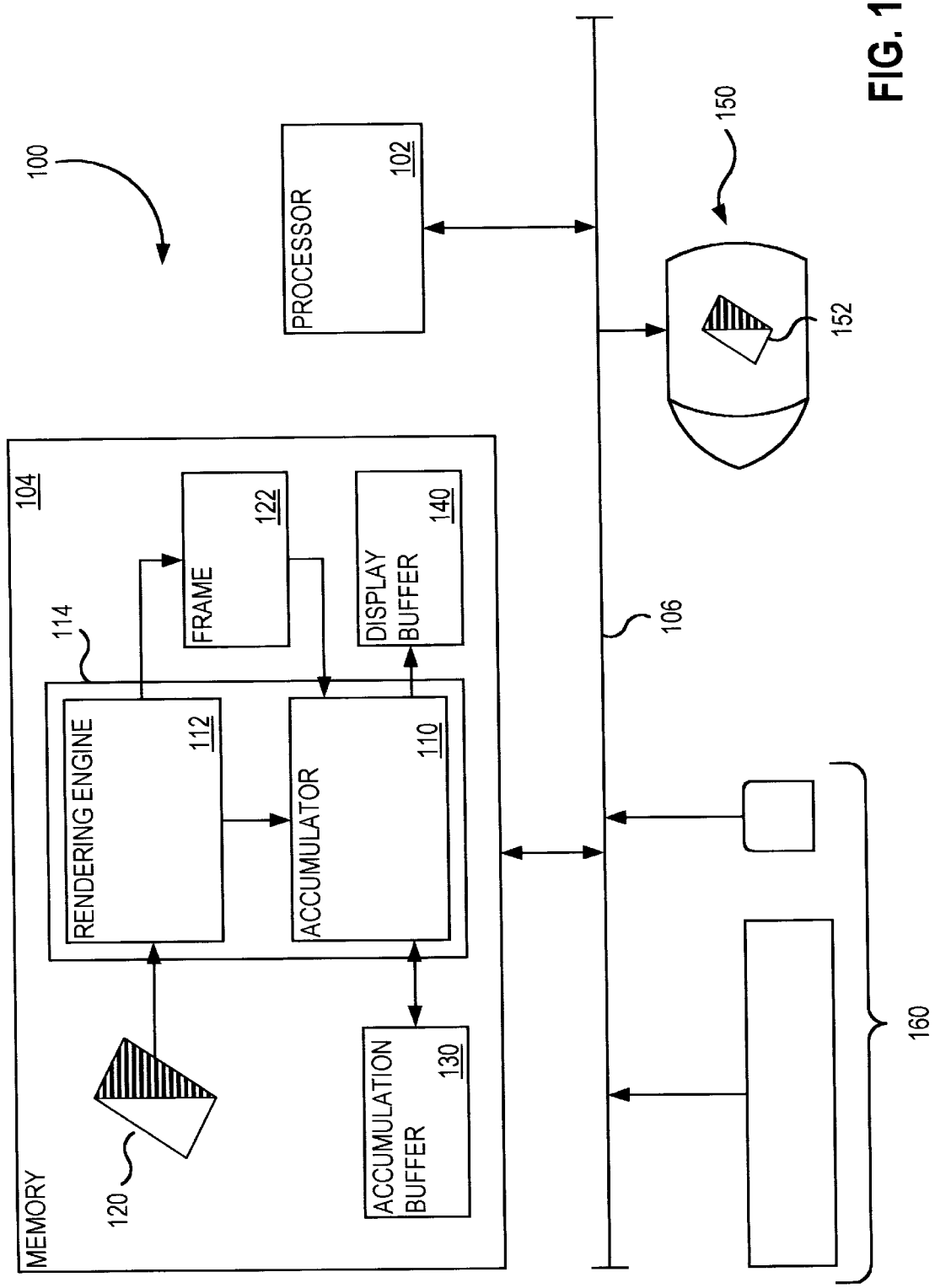
FIG. 1 is a block diagram of a computer system including an image processor and accumulator in accordance with the present invention.

In accordance with the present invention, multiple pipelines through a processor are used in a novel manner to more efficiently accumulate rendered images of one or more source objects 120 (FIG. 1) into an accumulation buffer 130. A computer system 100 within which such images are accumulated is generally of the structure shown. Computer system 100 includes a processor 102 which is coupled to a memory 104 through a bus 106. Processor 102 is described in greater detail below and fetches from memory 104 and executes computer instructions and reads data from and writes data to memory 104 in accordance with the fetched and executed instructions.

Memory 104 can include generally any type of memory, including without limitation randomly accessible memory (RAM), read-only memory (ROM), and secondary storage including storage media such as magnetic and optical storage devices. Stored within memory 104 are (i) source objects 120, (ii) accumulation buffer 130, and (iii) a display buffer 140. In addition, an image processor 114 is a computer process which executes within processor 102 from memory 104. Image processor 114 includes a rendering engine 112 which reads source objects 120 and renders one or more frames of pixel data representing a graphical representation within a computer display device 150 of source objects 120. Image processor 114 also includes an accumulator 110. Rendering engine 112 passes to accumulator 110 frames such as frame 122 for accumulation, in a manner described more completely below, in accumulation buffer 130 and in display buffer 140. The contents of display buffer 140 are displayed in computer display device 150.

In accordance with computer instructions fetched from memory 104 and executed by processor 102, processor 102 receives from one or more input devices 160 command signals generated by a user and sends to computer display device 150 display data and control signals. Each of input devices 160 can be any computer input device, including without limitation a keyboard, a keypad, or a pointing device such as a trackball, an electronic mouse, thumbwheels, a lightpen, or a digitizing tablet. Computer display device 150 can include any type of computer display device, including without limitation a cathode ray tube (CRT), a light-emitting diode (LED) display, or a liquid crystal display (LCD). Image processor 114 sometimes prompts a user, by displaying prompting data in computer display device 150, to select particular operational characteristics of rendering engine 112 and establishes specific operational characteristics of rendering engine 112 in response to control signals which are received through processor 102 from input devices 160 and which specify particular operational characteristics of rendering engine 112. Computer display device 150 continually displays the contents of display buffer 140. Image processor 114, after accumulating a number of frames of rendered source objects 120 into accumulation buffer 130, either accumulates the last frame into display buffer 140 or copies the contents of accumulation buffer 130 to display buffer 140 to thereby cause the display of the contents of display buffer 140 in computer display device 150 to display to the user accumulated graphical image 152.

Image Processing Overview

Figure 2:
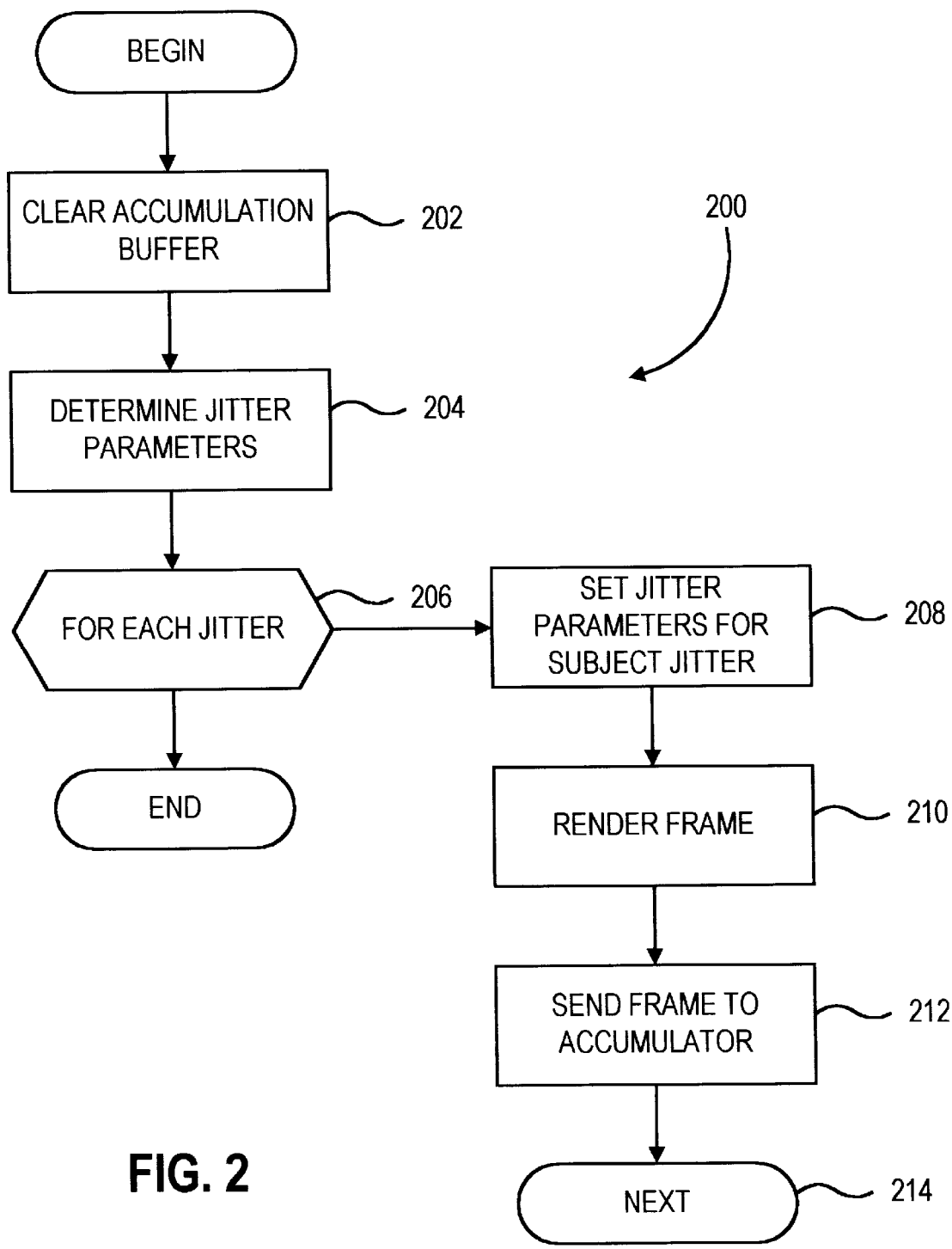
FIG. 2 is a logic flow diagram of the processing of the rendering engine of FIG. 1.

As described above, rendering engine 112 renders source objects 120 one or more times and each time sends the resulting frame to accumulator 110 for accumulation. The processing of rendering engine 112 is illustrated in logic flow diagram 200 (FIG. 2), according to which processing begins at step 202. In step 202, rendering engine 112 (FIG. 1) sends control signals to accumulator 110 which cause accumulator 110 to initialize accumulation buffer 130. For example, accumulator 110 can initialize accumulation buffer 130 such that the value of each component of each pixel of accumulation buffer 130 is a specific value, e.g., zero.

Processing transfers to step 204 (FIG. 2) in which rendering engine 112 (FIG. 1) determines a number of jitter parameters. Jitter parameters include data which determines how each of the frames to be accumulated differ from one another. For example, if image processor 114 uses accumulator 110 and accumulation buffer 130 for anti-aliasing renderings of source objects 120, the jitter parameters include data specifying (i) the number of frames to be accumulated, (ii) specific offsets by which each of the frames is to be translated prior to accumulation, (iii) specific frame and buffer weights, which are described more completely below, for each of the frames, and (iv) whether accumulation buffer 130 or display buffer 140 is the destination of the accumulated pixel data. Each set of jitter parameters defines a specific jitter, which is a rendering of source objects 120 according to a particular set of jitter parameters and which is accumulated by accumulator 110.

Processing transfers to loop step 206 (FIG. 2) which, in conjunction with next step 214, defines a loop in which each of the jitters is processed. For each jitter determined in step 204, processing transfers to step 208 for an iteration of the loop defined by loop step 206 and next step 214 in which the jitter processed is referred to as the subject jitter. Once each jitter has been processed, processing according to logic flow diagram 200 terminates.

In step 208, rendering engine 112 (FIG. 1) determines rendering parameters corresponding to the jitter parameters of the subject jitter. In step 210, to which processing transfers from step 208, rendering engine 112 renders source objects 120 in accordance with the rendering parameters determined in step 208. The rendering of source objects 120 is conventional and is not described further herein. In rendering source objects 120, rendering engine 112 produces a frame 122 which includes pixel data defining a graphical image in which source objects 120 are represented. Processing transfers from step 210 to step 212 in which rendering engine 112 sends to accumulator 110 selected jitter parameters of the subject jitter and frame 122 to thereby cause accumulator 110 to accumulate frame 122 into either accumulation buffer 130 or display buffer 140 according to the jitter parameters. From step 212 processing transfers through next step 214 to loop step 206 and the next jitter is processed according to the loop defined by loop step 206 and next step 214.

Processing by Accumulator 110

Figure 3:
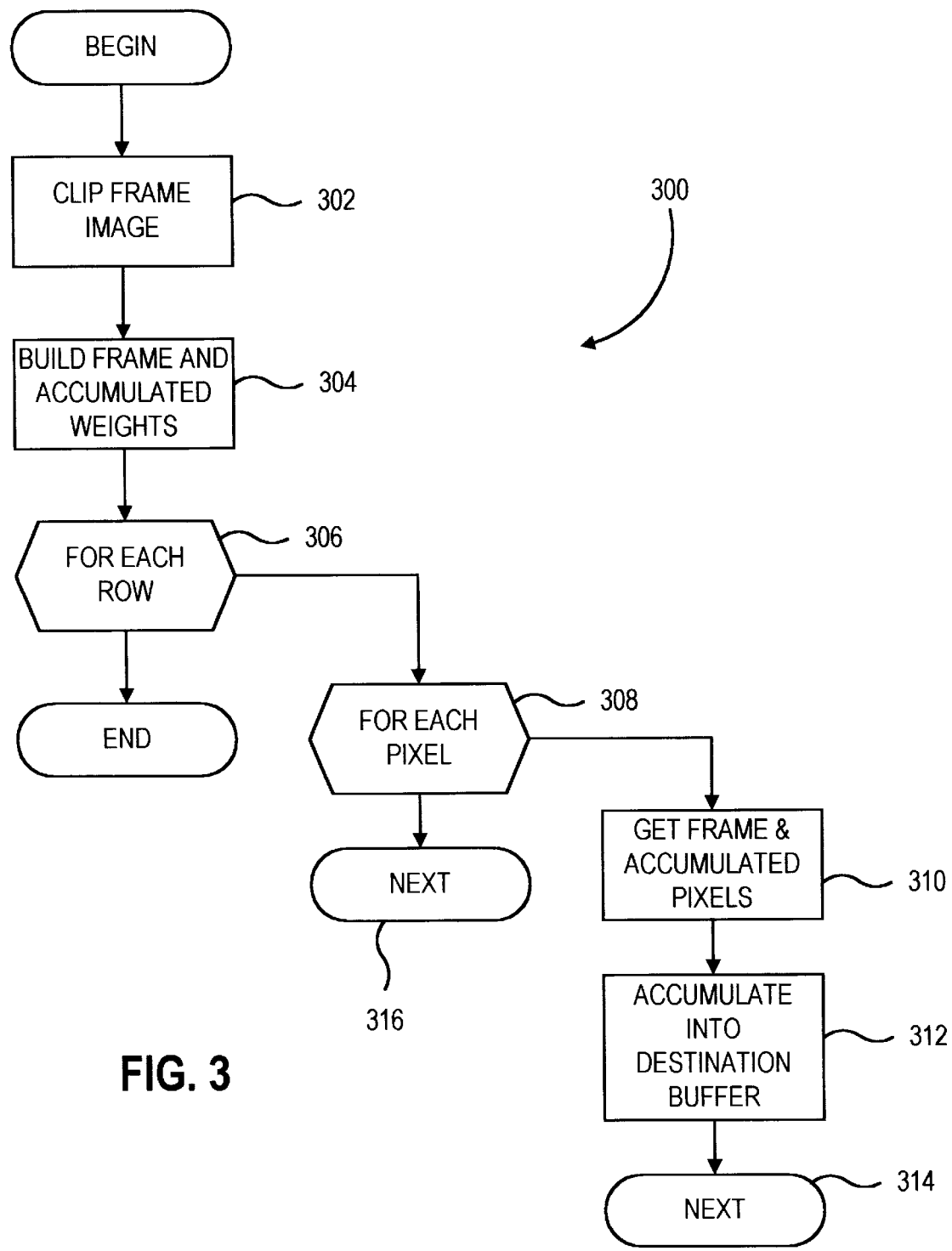
FIG. 3 is a logic flow diagram of the processing of the accumulator of FIG. 1.

Accumulation of frame 122 (FIG. 1) into accumulation buffer 130 by accumulator 110 is illustrated by logic flow diagram 300 (FIG. 3) in which processing begins with step 302. In step 302, accumulator 110 clips frame 122 to the size of the destination buffer as defined by the jitter parameters received from rendering engine 112. In one embodiment, accumulation buffer 130 and display buffer 140 are equal in size and frame 122 is clipped to the size of accumulation buffer 130 and display buffer 140. Processing transfers to step 304 in which frame and buffer weights are constructed from the jitter parameters received from rendering engine 112. The frame weight is the weight attributed to frame 122 during accumulation, and the buffer weight is the weight attributed to accumulation buffer 130 during accumulation. The frame and buffer weights and their use during accumulation are described more completely below.

Processing transfers to loop step 306 which, in conjunction with next step 316, defines a loop in which each row of frame 122 as clipped is processed. During each iteration of the loop of loop step 306 and next step 316, the row processed is called the subject row. For each row of frame 122, processing transfers from loop step 306 to loop step 308 and, thereafter, processing according to logic flow diagram 300 terminates from loop step 306.

Loop step 308 and next step 314 define a loop in which each pixel of the subject row of frame 122 as clipped is processed. During each iteration of the loop of loop step 308 and next step 314, the pixel processed is called the subject pixel. For each pixel of the subject row, processing transfers from loop step 308 to step 310 and, thereafter, through next step 316 to loop step 306 in which the next row of frame 122 is processed.

In step 310, accumulator 110 retrieves from frame 122 the subject pixel and from accumulation buffer 130 a corresponding buffer pixel. In one embodiment, the corresponding buffer pixel of accumulation buffer 130 has substantially the same device coordinates as the subject pixel of frame 122. Processing transfers to step 312 in which accumulator 110 accumulates the subject pixel and the buffer pixel to produce an accumulated pixel and stores the accumulated pixel in the destination buffer, i.e., the one of accumulation buffer 130 or display buffer 140 as specified by the jitter parameters received from rendering engine 112. The subject pixel and the buffer pixel are accumulated according to equation (1) below.

$$\text{(accumulated pixel)} = w_b \cdot \text{(buffer pixel)} + w_f \cdot \text{(subject pixel)} \quad (1)$$

In equation (1), $w_b$ is the buffer weight and $w_f$ is the frame weight.

As described more completely below, processor 102 performs partitioned arithmetic operations in which multiple partitioned numbers of a single data word are processed simultaneously and in parallel. In one embodiment, a pixel of frame 122 is a 32-bit word which is partitioned into four eight-bit unsigned integer numbers, and a pixel in accumulation buffer 130 is a 64-bit word which is partitioned into four sixteen-bit signed fixed point numbers.

Figure 4:
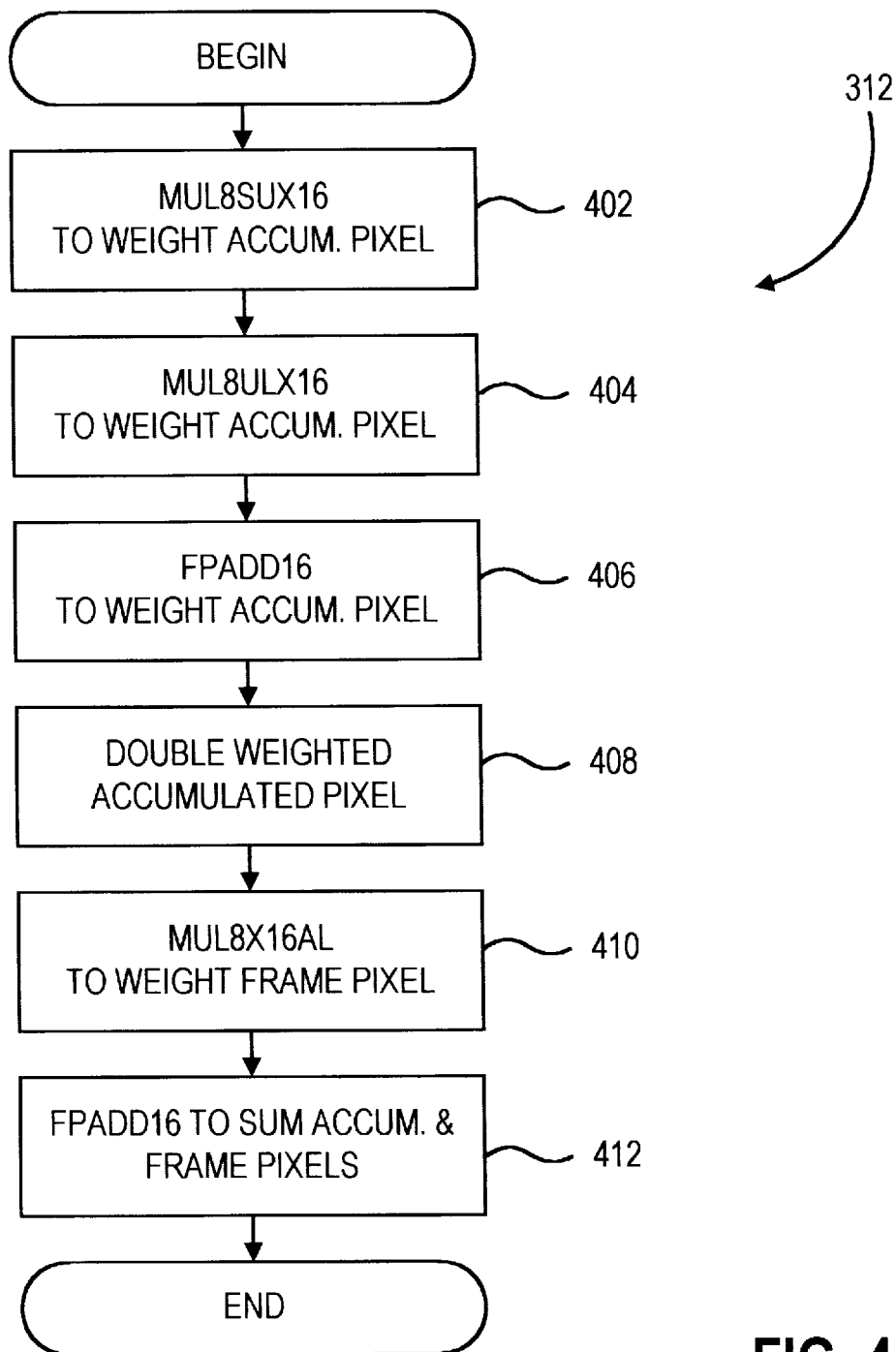
FIG. 4 is a logic flow diagram of the accumulation of a single pixel by the accumulator of FIG. 1 in accordance with the present invention.
Figure 5:
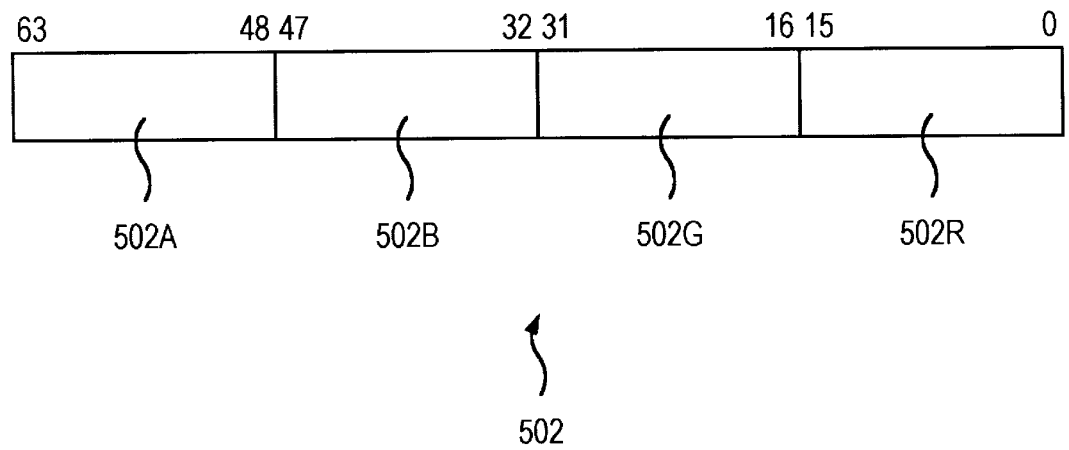
FIG. 5 is a block diagram of a buffer pixel data word.

As described above, accumulator 110 calculates an accumulated pixel from the subject pixel of frame 122 and a corresponding buffer pixel of accumulation buffer 130 according to equation (1) above in step 312. Step 312 is shown in greater detail as logic flow diagram 312 (FIG. 4). According to logic flow diagram 312, buffer pixel data word 502 (FIG. 5) from accumulation buffer 130 (FIG. 1) includes four partitioned sixteen-bit fixed point numbers which are referred to as partitioned components 502R, 502G, 502B, and 502A, which corresponding to red, green, blue, and alpha components, respectively, of the accumulated pixel represented by buffer pixel data word 502. Processing according to logic flow diagram 312 (FIG. 4) begins with steps 402, 404, and 406, in which accumulator 110 (FIG. 1) issues computer instructions to processor 102 to multiply each of partitioned components 502R, 502G, 502B, and 502A by the buffer weight specified by rendering engine 112 as described above.

In one embodiment, processor 102 performs a partitioned multiplication operation, which is sometimes referred to herein as the MUL8SUX16 operation, in which the upper signed eight bits of each of four partitioned sixteen-bit numbers of a first 64-bit word is multiplied by a respective, corresponding partitioned sixteen-bit signed fixed point number of a second 64-bit word. Processor 102 stores the result of each partitioned multiplication in a respective partitioned sixteen-bit fixed point number a third 64-bit word. In this embodiment, processor 102 also performs a different partitioned multiplication operation, which is sometimes referred to herein as the MUL8ULX16 operation, in which the lower unsigned eight bits of each of four partitioned sixteen-bit fixed point numbers of a first 64-bit word is multiplied by a respective, corresponding partitioned sixteen-bit fixed point number of a second 64-bit word. Processor 102 stores the result of each partitioned multiplication in a respective partitioned sixteen-bit fixed point number of a third 64-bit word. Processor 102 further performs a partitioned addition operation, which is sometimes referred to herein as the FPADD16 operation, in which respective partitioned sixteen-bit fixed point numbers of two 64-bit words are summed and the resulting partitioned sums are each stored in a respective partitioned sixteen-bit fixed point number of a third 64-bit word.

In this embodiment, four partitioned sixteen-bit numbers of a first 64-bit word can be multiplied by four respective partitioned sixteen-bit fixed point numbers of a second 64-bit word simultaneously and in parallel by (i) multiplying the first and second 64-bit words using the MUL8SUX16 operation to produce a first partitioned product in step 402, (ii) multiplying the first and second 64-bit words using the MUL8ULX16 operation to produce a second partitioned product in step 404, and (iii) adding the first and second partitioned products using the FPADD16 operation in step 406. The result of the FPADD16 operation is the partitioned product of the first and second 64-bit words, in which each of the four partitioned sixteen-bit fixed point number of the partitioned product is the product of respective partitioned sixteen-bit fixed point numbers of the first and second 64-bit words.

Figure 6:
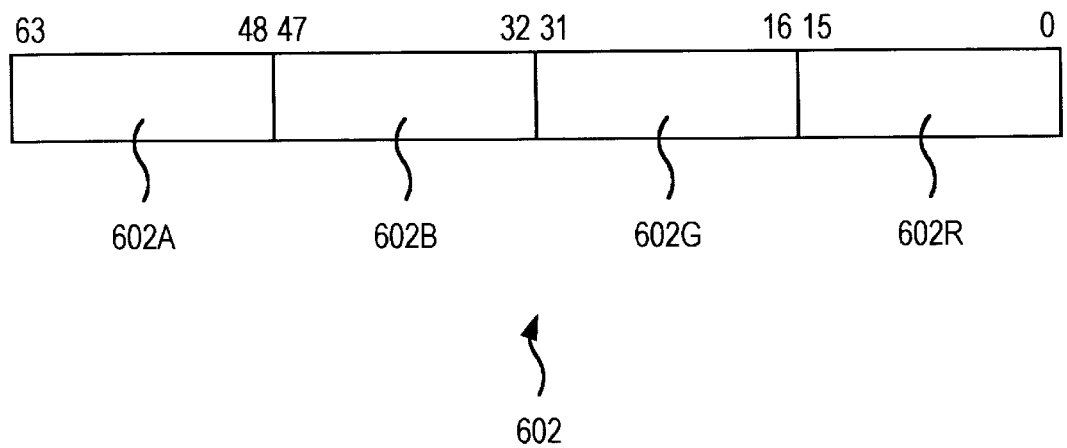
FIG. 6 is a block diagram of a buffer weight data word.

In step 304 which is briefly described above, accumulator 110 (FIG. 1) builds a 64-bit partitioned buffer weight word 602 (FIG. 6) by (i) formatting the buffer weight as a sixteen-bit fixed point number and packing the sixteen-bit fixed point number into each of the four partitioned sixteen-bit numbers of 64-bit buffer weight data word 602. By use of the MUL8SUX16, MUL8ULX16, and FPADD16 operations processor 102 multiplies all four components of buffer pixel word 502 by a respective partitioned sixteen-bit fixed point buffer weight of 64-bit buffer weight word 602 in three instruction cycles.

Figure 7:
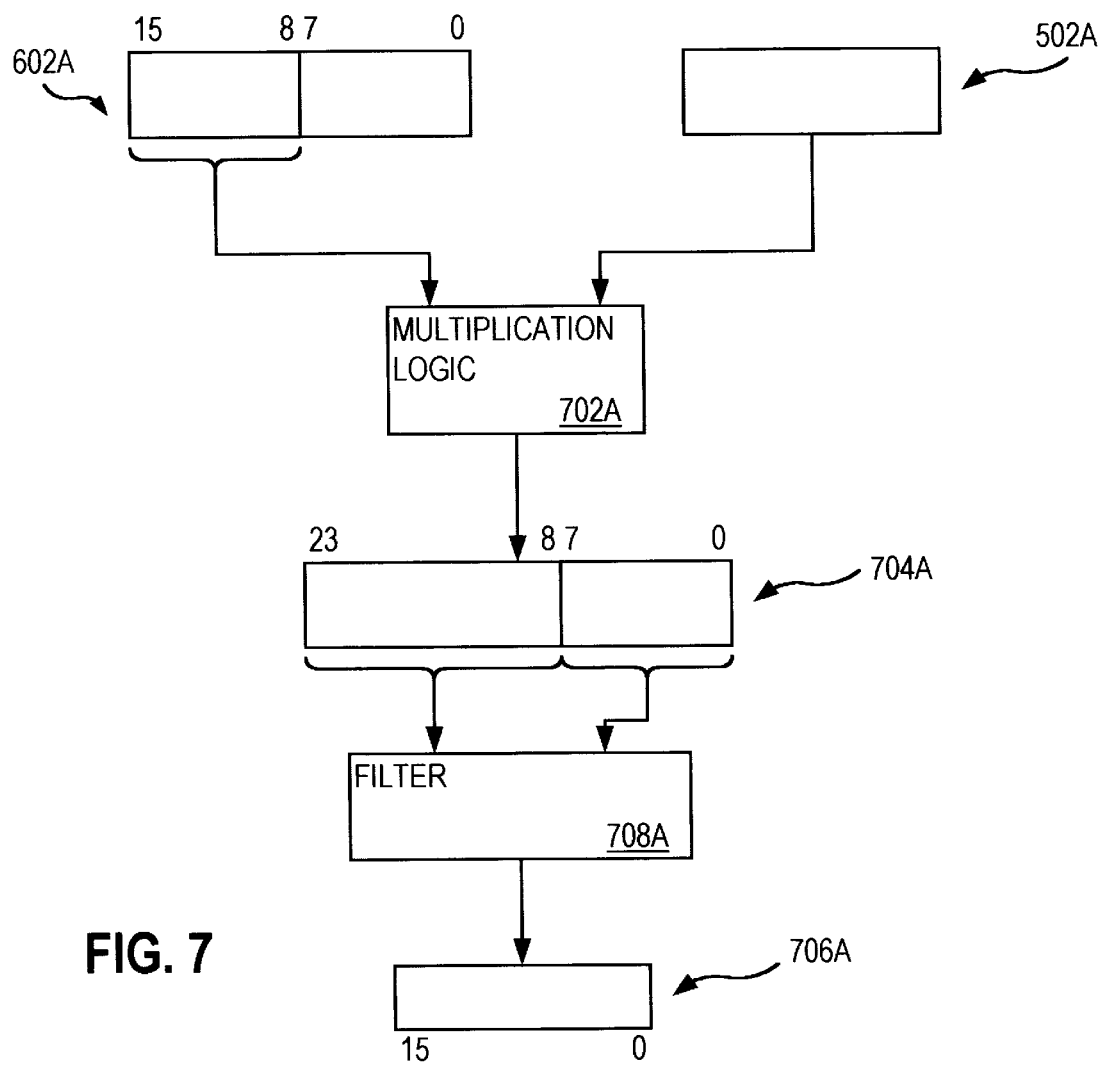
FIG. 7 is a block diagram illustrating performance of a partitioned multiplication operation.
Figure 9:
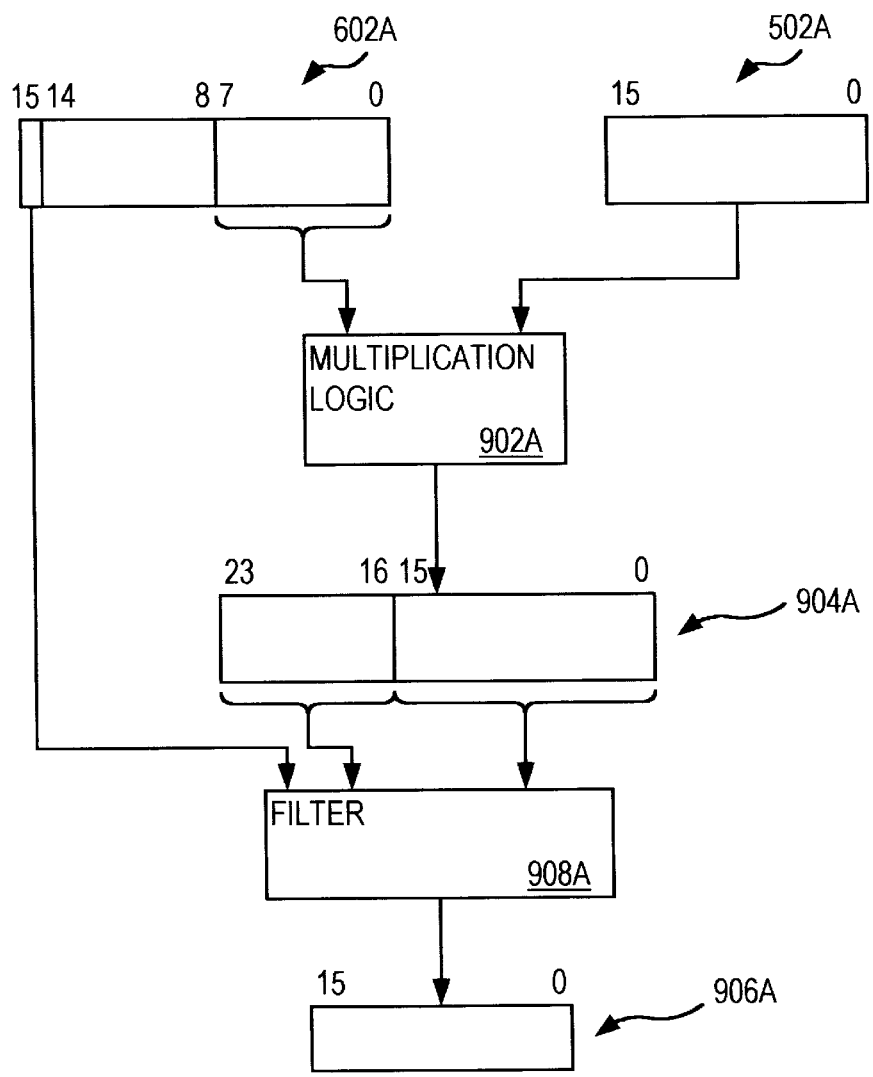
FIG. 9 is a block diagram illustrating performance of another partitioned multiplication operation.

FIGS. 7 and 9 show specific implementations of the MUL8SUX16 and MUL8ULX16 operations, respectively, by processor 102. FIG. 7 illustrates the processing of a single partitioned component 502A of buffer pixel data word 502 (FIG. 5) and a single partitioned buffer weight 602A of partitioned buffer weight word 602 (FIG. 6) in the MUL8SUX16 operation. Each of partitioned components 502R, 502G, and 502B, in conjunction with each of partitioned buffer weights 602R, 602G, and 602B, respectively, is processed simultaneously by duplicate logic within processor 102 which is directly analogous to the logic represented in FIG. 7. Therefore, the following description of the processing of partitioned component 502A and corresponding partitioned buffer weight 602A is equally applicable to the simultaneous processing of partitioned components 502R, 502G, and 502B and respective partitioned buffer weights 602R, 602G, and 602B.

Figure 8:
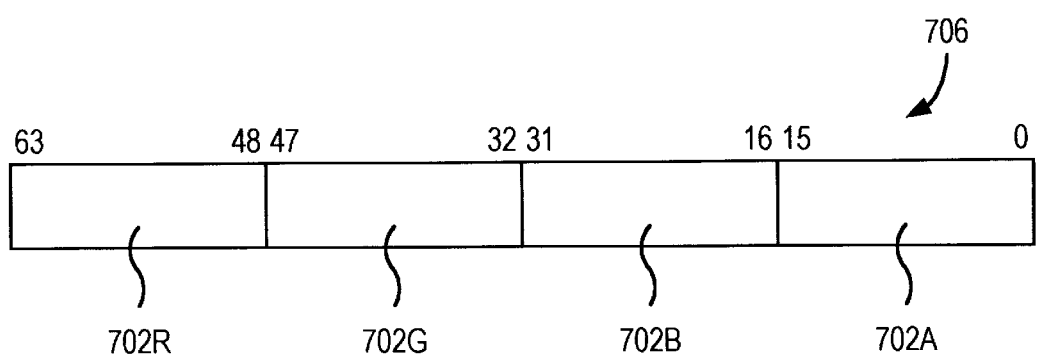
FIG. 8 is a block diagram of a first partial weighted buffer pixel data word formed by the partitioned multiplication operation illustrated in FIG. 7.

Processor 102 includes multiplication logic 702A which performs an integer multiplication operation in which the most significant eight bits of partitioned buffer weight 602A, which are treated by multiplication logic 702A as a signed, eight-bit integer, are multiplied by the sixteen bits of partitioned component 502A. The result of the multiplication is a 24-bit data word 704A. Processor 102A includes a filter 708A in which the most significant sixteen bits of data word 704A are parsed from data word 704A and are rounded accordingly to the least significant eight bits of data word 704A. The resulting of the parsing and rounding by filter 708A is stored in partitioned sixteen-bit fixed point number 706A of a 64-bit word 706 (FIG. 8).

FIG. 9 illustrates the processing of a single partitioned component 502A of buffer pixel data word 502 (FIG. 5) and a single partitioned buffer weight 602A of partitioned buffer weight word 602 (FIG. 6) in the MUL8ULX16 operation. Each of partitioned components 502R, 502G, and 502B, in conjunction with each of partitioned buffer weights 602R, 602G, and 602B, respectively, is processed simultaneously by duplicate logic within processor 102 which is directly analogous to the logic represented in FIG. 9. Therefore, the following description of the processing of partitioned sixteen-bit fixed point number 502A and corresponding partitioned buffer weight 602A is equally applicable to the simultaneous processing of partitioned components 502R, 502G, and 502B and respective partitioned buffer weights 602R, 602G, and 602B.

Figure 10:
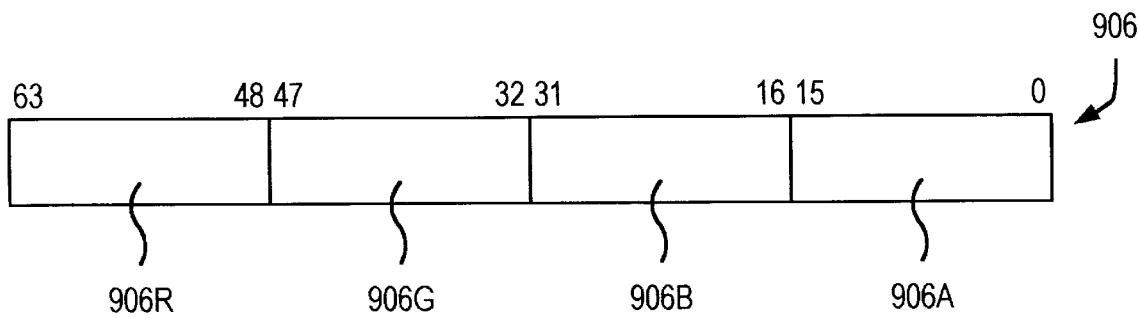
FIG. 10 is a block diagram of a second partial weighted buffer pixel data word formed by the partitioned multiplication operation of FIG. 9.

Processor 102 includes multiplication logic 902A which performs an integer multiplication operation in which the least significant eight bits of partitioned buffer weight 602A, which are treated by multiplication logic 902A as an unsigned, eight-bit integer, are multiplied by the sixteen bits of partitioned component 502A. The result of the multiplication is a 24-bit data word 904A. Processor 102A includes a filter 908A in which the most significant eight bits of data word 904A (i) are parsed from data word 904A, (ii) are rounded accordingly to the least significant sixteen bits of data word 904A, and (iii) sign extended to sixteen bits according to the sign of partitioned buffer weight 602A. In other words, filter 908A produces (i) a sixteen-bit two's complement of the rounded most significant eight bits of data word 904A if partitioned buffer weight 602A is negative or (ii) a sixteen-bit number equal to the rounded most significant eight bits of data word 904A if partitioned buffer weight 602A is non-negative. The sixteen-bit number produced by filter 908A is stored in a partitioned sixteen-bit fixed point number 906A of a partitioned 64-bit word 906 (FIG. 10).

Figure 11:
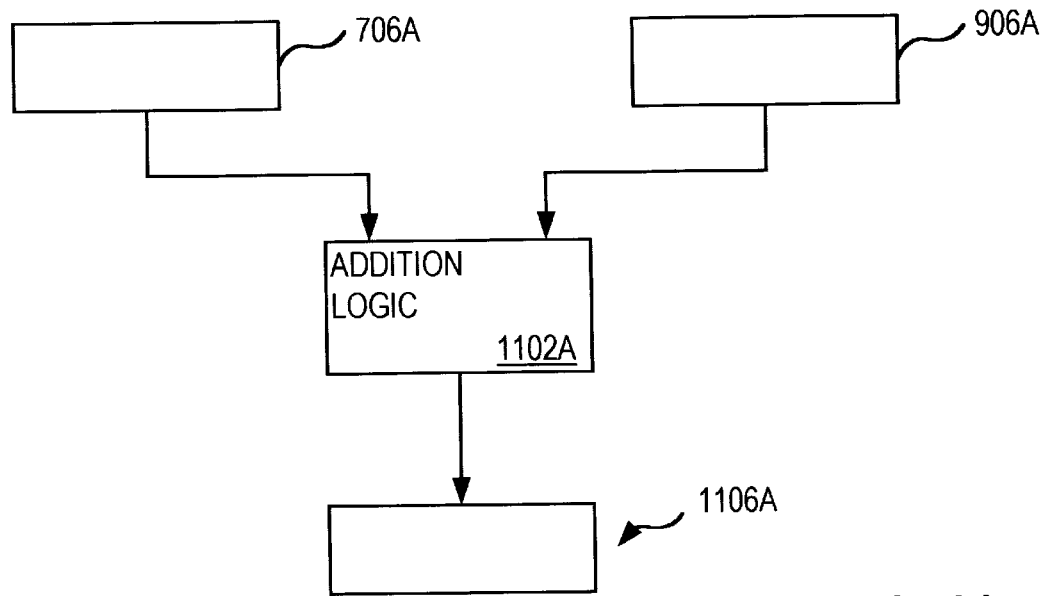
FIG. 11 is a block diagram illustrating performance of a partitioned addition operation.

To produce the four partitioned sixteen-bit products of respective partitioned buffer weights and respective partitioned components of buffer pixel data word 502, data words 706 (FIG. 8) and 906 (FIG. 10) are summed using the FPADD16 operation in step 406 (FIG. 4). FIG. 11 illustrates the processing of single partitioned sixteen-bit fixed point numbers 706A and 906A of 64-bit word 706 (FIG. 8) and 64-bit word 906 (FIG. 9) in the FPADD16 operation. Each of partitioned numbers 706R, 706G, and 706B, in conjunction with each of partitioned numbers 906R, 906G, and 906B, respectively, is processed simultaneously by duplicate logic within processor 102 which is directly analogous to the logic represented in FIG. 11. Therefore, the following description of the processing of partitioned number 706A and corresponding partitioned number 906A is equally applicable to the simultaneous processing of partitioned numbers 706R, 706G, and 706B and respective partitioned numbers 906R, 906G, and 906B.

Figure 12:
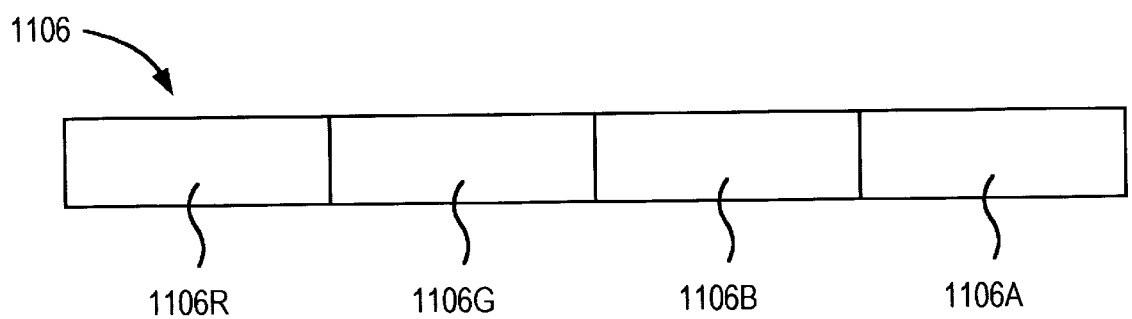
FIG. 12 is a block diagram of a weighted buffer pixel data word formed by the partitioned addition operation of FIG. 11.
Figure 13:
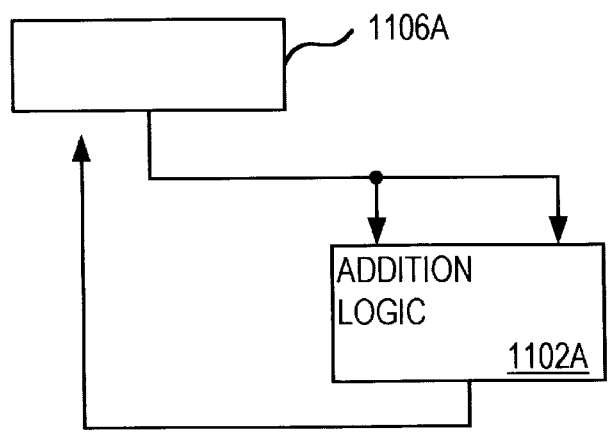
FIG. 13 is a block diagram illustrating the doubling of the weighted buffer pixel data word using the partitioned addition operation of FIG. 11.

Processor 102 includes addition logic 1102A which sums sixteen-bit fixed point numbers 706A and 906A and stores the result in partitioned sixteen-bit fixed point number 106A of weighted buffer pixel data word 1106 (FIG. 12). Thus, after performance of step 406 (FIG. 4), partitioned data word 1106 includes four partitioned sixteen-bit fixed point numbers 1106R, 1106G, 1106B, and 1106A which are each a respective product of partitioned buffer weights 602R, 602G, 602B, and 602A and partitioned components 502R, 502G, 502B, and 502A, respectively.

In general, weights by which buffer pixels and pixels of frame 122 range from approximately 0.0 to approximately 1.0. As described above, the MUL8SUX16 and MUL8ULX16 operations require that partitioned buffer weights 602R, 602G, 602B, and 602A (FIG. 7) be signed, i.e., that the most significant bit of partitioned buffer weights 602R, 602G, 602B, and 602A is reserved as a sign bit. In addition, the product of the signed upper eight bits of each of partitioned buffer weights 602R, 602G, 602B, and 602A is right-shifted by eight bits as described above. As a result, each of partitioned buffer weights 602R, 602G, 602B, and 602A can effectively have a value in the range of approximately −0.5 to approximately 0.5.

To enable multiplication of components of buffer pixel data word 502 by buffer weights in the range of approximately 0.0 to approximately 1.0, each partitioned buffer weight of buffer weight data word 602 is scaled such that a buffer weight of 0.0 is represented by partitioned buffer weights 602R, 602G, 602B, and 602A having values of 0.0 and a buffer weight of 1.0 is represented by partitioned buffer weights 602R, 602G, 602B, and 602A having values of approximately 0.5. As a result, the sixteen-bit product selected from 24-bit word 704A by filter 708A has a value of one-half the desired value assuming that the sixteen-bit product selected by filter 708A has an implicit decimal point at the same position as the implicit decimal point in partitioned component 502A. The desired value is the product of buffer weight represent partitioned buffer weight 602A, as defined prior to scaling as described above, and partitioned component 502A.

Therefore, to enable representation of an accumulation weight of 1.0 in each of partitioned buffer weights 602R, 602G, 602B, and 602A, accumulator 110 (FIG. 1) doubles each partitioned product of data word 1106 in step 408 (FIG. 4). In particular, accumulator 110 (FIG. 1) invokes the FPADD16 operation within processor 102 and supplies as the two operands to be summed data word 1106 and data word 1106 again. The resulting sum is then stored in data word 1106 to thereby effectively double data word 1106. Hence, by doubling data word 1106, the effective range of each partitioned buffer weight of buffer weight data word 602 is adjusted from between approximately −0.5 and approximately 0.5 to between approximately −1.0 to 1.0. As a result, buffer weights in the range of approximately 0.0 to approximately 1.0 are accommodated.

Figure 14:
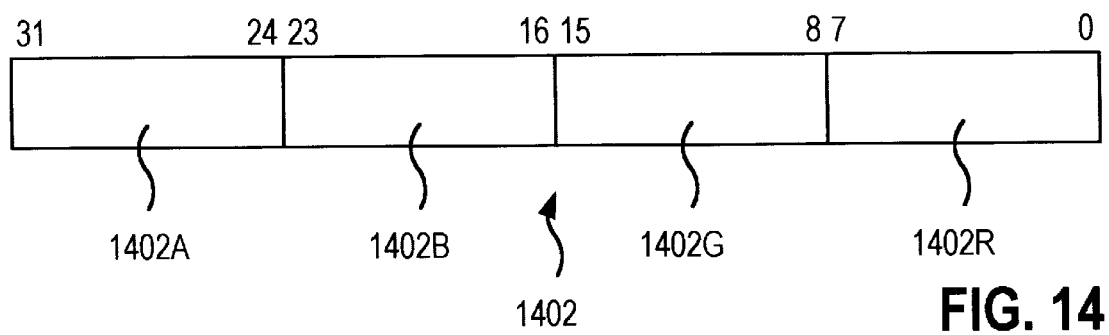
FIG. 14 is a block diagram of a frame pixel data word.

Processing transfers from step 408 FIG. 4) to step 410 in which accumulator 110 (FIG. 1) weights the pixel data of frame 122 according to the frame weight supplied by rendering engine 112 as described above. In step 410, accumulator 110 issues to processor 102 a computer instruction which causes processor 102 to perform a MUL8X16AL operation in which each partitioned eight-bit number of the subject pixel data 1402 (FIG. 14) is multiplied by a sixteen-bit fixed point number representing the frame weight. In particular, subject pixel data 1402 is a 32-bit word which includes four partitioned eight-bit numbers, i.e., partitioned components 1402R, 1402G, 1402B, and 1402A which represent red, green, blue, and alpha components, respectively, of the subject pixel. The frame weight is represented by frame weight 1500U (FIG. 15), which is the lower sixteen-bits of a 32-bit word 1500.

Figure 15:
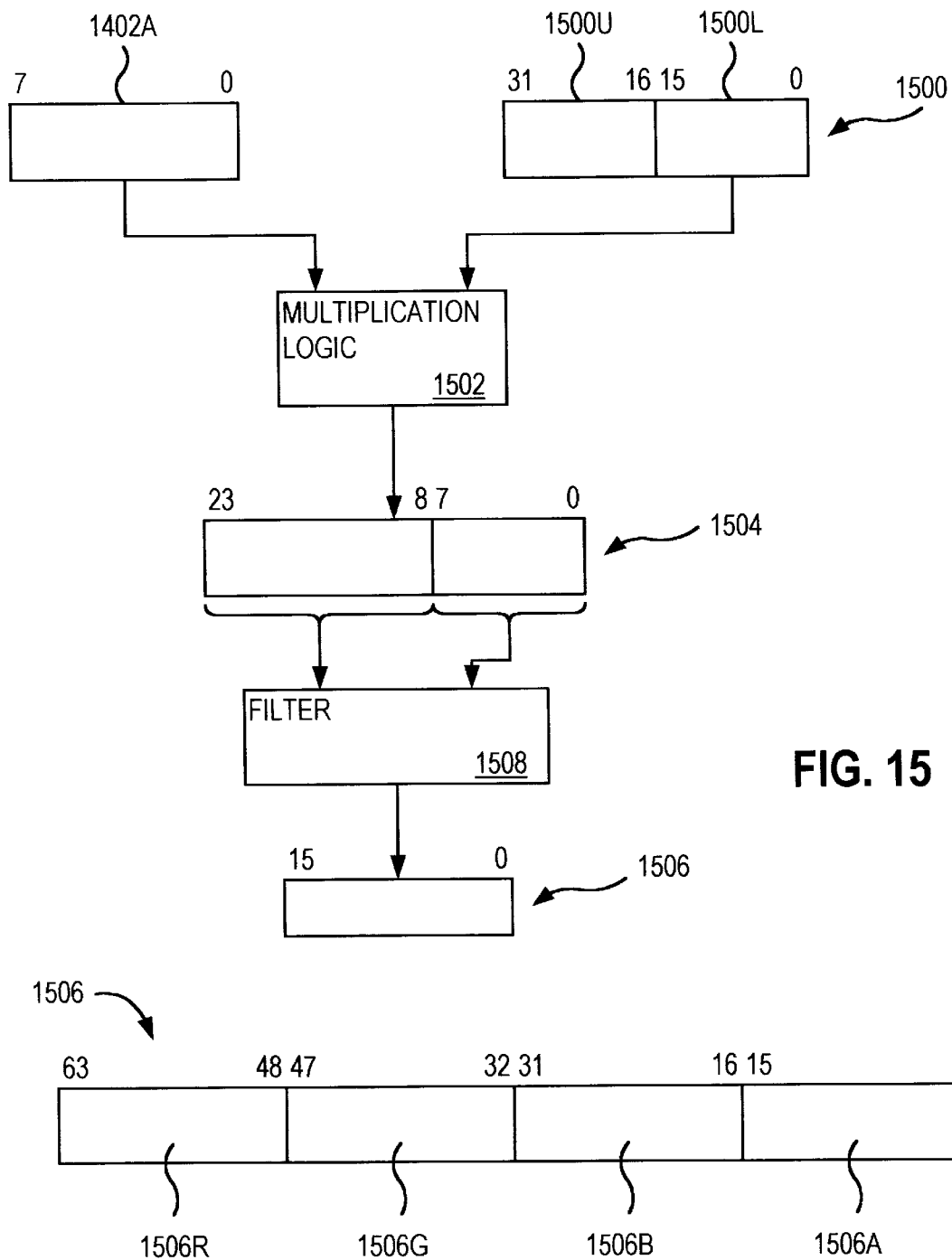
FIG. 15 is a block diagram illustrating performance of a third partitioned multiplication operation.

FIG. 15 illustrates the processing of a single partitioned component 1402A of subject pixel word 1402 (FIG. 12) and frame weight 1500U in the MUL8X16AL operation. Each of partitioned components 1402R, 1402G, and 1402B, in conjunction with frame weight 1500U, is processed simultaneously by duplicate logic within processor 102 which is directly analogous to the logic represented in FIG. 15. Therefore, the following description of the processing of partitioned component 1402A and frame weight 1500U is equally applicable to the simultaneous processing of partitioned components 1402R, 1402G, and 1402B and frame weight 1500U.

Figure 16:
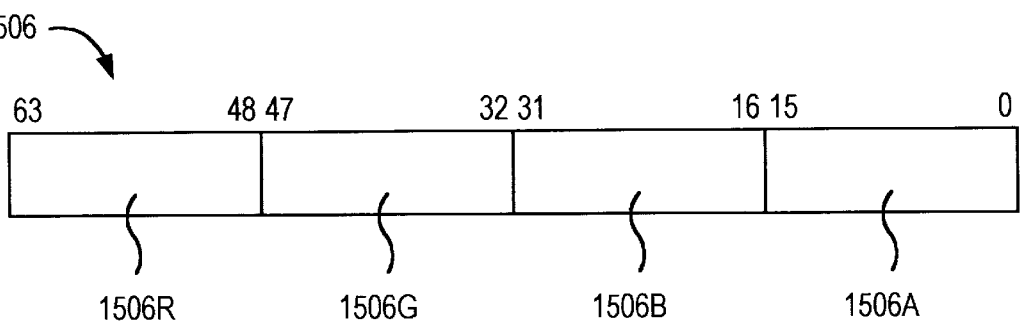
FIG. 16 is a block diagram of a weighted frame pixel data word formed by the partitioned multiplication operation of FIG. 15.

Processing 102 includes multiplication logic 1502A which performs an integer multiplication operation in which frame weight 1500U is multiplied by the eight bits of partitioned component 1402A. The result of the multiplication is a 24-bit data word 1504A. Processor 102A includes a filter 1508A in which the most significant sixteen bits of data word 1504A are parsed from data word 1504A and are rounded accordingly to the least significant eight bits of data word 1504A. The resulting of the parsing and rounding by filter 1508A is stored in partitioned sixteen-bit fixed point number 1506A of a 64-bit word 1506 (FIG. 16). Therefore, by using the MUL8X16AL operation, all four components of the subject pixel are weighted according to the frame weight in a single instruction cycle.

Thus, the subject pixel, as weighted by the frame weight, is stored in 64-bit data word 1506 after performance of step 410 (FIG. 4) by accumulator 110. As described above, the accumulated pixel, as weighted by the accumulation weight, is stored in 64-bit data word 1106 after performance of steps 402–408 (FIG. 4) by accumulator 110. In step 412, accumulator calculates a destination pixel, which is represented by a 64-bit destination pixel word which includes four partitioned sixteen-bit fixed point numbers, each of which represents a respective component of the destination pixel, by performance of the FPADD16 operation as described above with respect to FIG. 11. Thus, all four components of the weighted buffer pixel and the weighted subject pixel are summed in a single instruction cycle. The resulting destination pixel is stored in the buffer specified by the particular jitter parameters received from rendering engine 110 as described above, i.e., either accumulation buffer 130 or display buffer 140.

By accumulating a buffer pixel and the subject pixel in the manner described above, nine instruction cycles are required to accumulate a single color pixel which therefore has four components. Specifically, two read operations are used to read the buffer and subject pixels; three multiplication operations and three addition operations are used to calculate a destination color pixel; and a store operation is used to store the resulting destination pixel. Thus, one million pixels can be accumulated according to the present invention in nine million instruction cycles compared to conventional accumulation mechanisms which require as many as 24 million instruction cycles to accumulate one million pixels.

Further Improvements Provided by the Architecture of Processor 102

Figure 17:
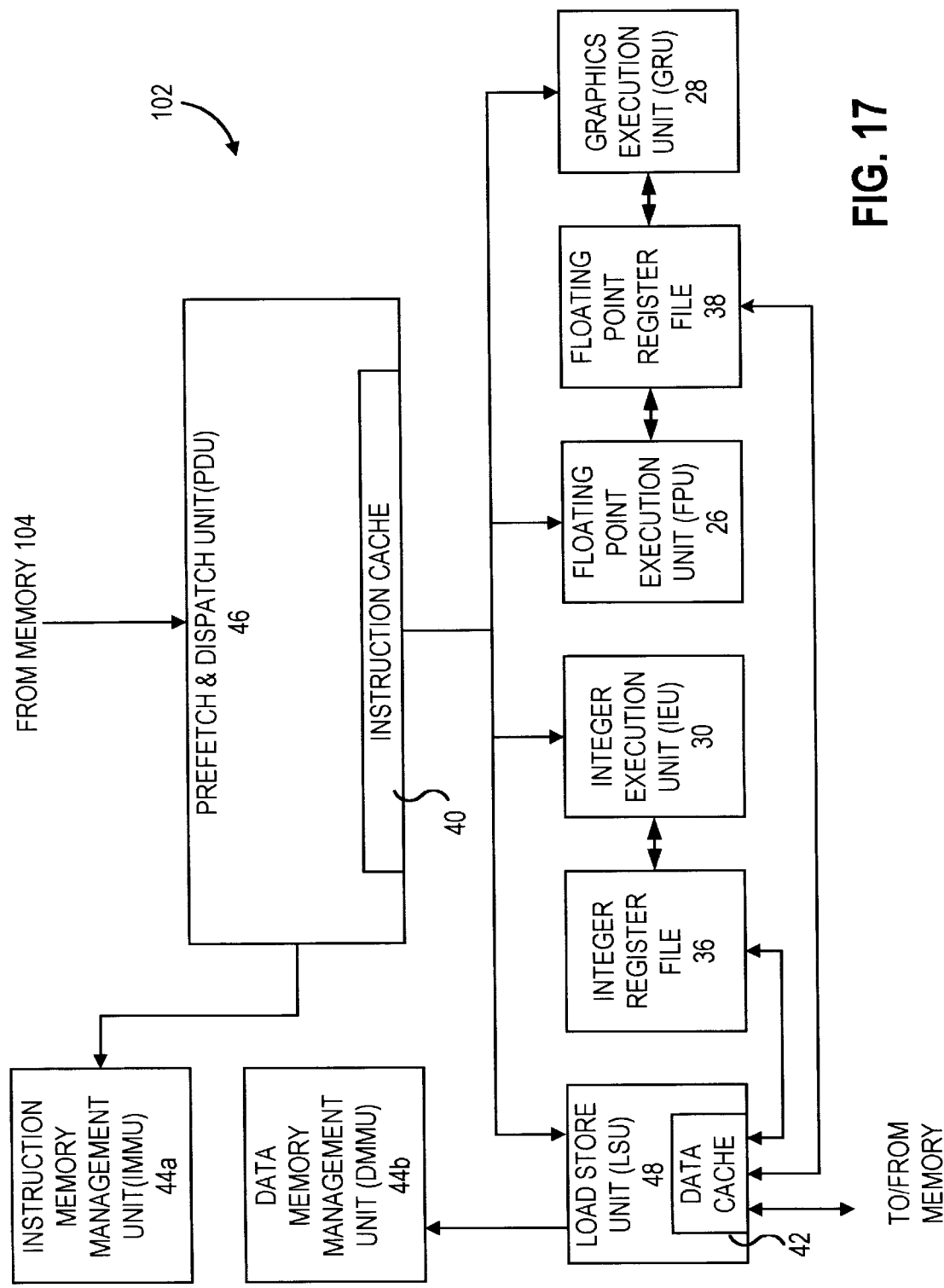
FIG. 17 is a block diagram of the processor of FIG. 1.

In addition to the improvements in accumulation efficiency described above, the architecture of processor 102 provides further improvements in efficiency. Processor 102 is shown in greater detail in FIG. 17 and is described briefly herein and more completely in U.S. patent application Ser. No. 08/236,572 by Timothy J. Van Hook, Leslie Dean Kohn, and Robert Yung, filed Apr. 29, 1994 and entitled "A Central Processing Unit with Integrated Graphics Functions" (the '572 application) which is incorporated in its entirety herein by reference. Processor 102 includes a prefetch and dispatch unit (PDU) 46, an instruction cache 40, an integer execution unit (IEU) 30, an integer register file 36, a floating point unit (FPU) 26, a floating point register file 38, and a graphics execution unit (GRU) 28, coupled to each other as shown. Additionally, processor 102 includes two memory management units (IMMU & DMMU) 44a–44b, and a load and store unit (LSU) 48, which in turn includes data cache 42, coupled to each other and the previously described elements as shown. Together, the components of processor 102 fetch, dispatch, execute, and save execution results of computer instructions, e.g., computer instructions of image processor 130, in a pipelined manner.

PDU 46 fetches instructions from memory 104 (FIG. 1) and dispatches the instructions to IEU 30 (FIG. 17), FPU 26, GRU 28, and LSU 48 accordingly. Prefetched instructions are stored in instruction cache 40. IEU 30 (FIG. 17), FPU 26, and GRU 28 perform integer, floating point, and graphics operations, respectively. In general, the integer operands/results are stored in integer register file 36, whereas the floating point and graphics operands/results are stored in floating point register file 38. Additionally, IEU 30 also performs a number of graphics operations, and appends address space identifiers (ASI) to addresses of load/store instructions for LSU 48, identifying the address spaces being accessed. LSU 48 generates addresses for all load and store operations. The LSU 48 also supports a number of load and store operations, specifically designed for graphics data. Memory references are made in virtual addresses. MMUs 44a–44b map virtual addresses to physical addresses.

PDU 46, IEU 30, FPU 26, integer and floating point register files 36 and 38, MMUs 44a–44b, and LSU 48 can be coupled to one another in any of a number of configurations as described more completely in the '572 application.

As described more completely in the '572 application with respect to FIGS. 8a–8d thereof, GRU 28 is an arithmetic processing unit and performs partitioned multiplication operations and partitioned addition operations. Specifically, GRU 28 performs the MULSUX16, MUL8ULX16, MUL8X16AL, and FPADD16 operations described above.

As described above, processor 102 includes four (4) separate processing units, i.e., LSU 48, IEU 30, FPU 26, and GRU 28. Each of these processing units is described more completely in the '572 application. These processing units operate in parallel and can each execute a respective computer instruction while others of the processing units execute different computer instructions. GRU 28 executes the partitioned multiplication and partitioned addition operations described above. As described in the '572 application, GRU 28 has two separate execution paths and can execute two instructions simultaneously. GRU 28 can execute a partitioned addition operation while simultaneously executing a partitioned multiplication operation. By pipelining the various operations described above in a manner described more completely below, performance in accumulating pixels into accumulation buffer 130 (FIG. 1) is enhanced.

GRU 28 (FIG. 7) cannot execute more than one partitioned multiplication operation or more than one partitioned addition operation at a time but can perform one partitioned multiplication operation and one partitioned addition operation substantially simultaneously. By appropriately pipelining instructions to achieve such parallelism, processor 102 is more completely used and convolution of source image 110 is performed more efficiently.

Table A shows computer instructions of image processor 130 pipelined so as to achieve the level of parallelism in processor 102 described above. In instruction cycles 1 and 2 of Table A, LSU 48 of processor 102 (FIG. 1) receives from accumulator 110 buffer weight data word 602 (FIG. 6) and frame weight data word 1500 (FIG. 15). In instruction cycle 3, LSU 48 retrieves from accumulation buffer 130 a buffer pixel. In instruction cycles 4–6, both pipelines of GRU 28 weights the buffer pixel with the buffer weight in the manner described above, using the MUL8SUX16, MUL8ULX16, and FPADD16 operations. In instruction cycle 7, GRU 28 doubles the weighted buffer pixel as described above using the FPADD16.

Simultaneously with the weighting of the buffer pixel, e.g., in instruction cycle 6, LSU 28 retrieves from frame 122 a frame pixel, e.g., the subject pixel. While one pipeline of GRU 28 doubles the weighted buffer pixel in instruction cycle 7 as described above, the other pipeline of GRU 28 weights the frame pixel according to the frame weight. Also in instruction cycle 7, LSU 48 retrieves from accumulation buffer 130 the next buffer pixel to process.

In the next instruction cycle, i.e., instruction cycle 8, one pipeline of GRU 28 sums the weighted buffer pixel and the weighted frame pixel to produce a new accumulated, destination pixel. Simultaneously, the other pipeline of GRU 28 begins weighting of the next buffer pixel by performance of the MUL8SUX16 operation in the manner described above. The weighting of the next buffer pixel continues in instruction cycles 9 and 10 as shown in Table A. Simultaneously, in instruction cycle 9, LSU 48 stores in either accumulation buffer 130 or display buffer 140 the resulting destination pixel calculated in instruction cycle 8. In the following instruction cycle, i.e., in instruction cycle 10, LSU 48 retrieves from frame 122 the next frame pixel.

Thus, in instruction cycles 3–9, a single frame pixel is accumulated with a buffer pixel and the resulting destination pixel is stored in the specified destination buffer. Similarly, the next frame pixel and the next buffer pixel are accumulated in a directly analogous manner in instruction cycles 7–13, and the subsequent frame and buffer pixels are accumulated to produce another resulting destination pixel in instruction cycles 11–17. Thus, six instruction cycles are required to accumulate a single pixel. However, since the accumulation of subsequent pixels overlap as shown in Table A, a pixel is accumulated every four instruction cycles. As a result, an image of one million pixels can be accumulated in approximately four million instruction cycles compared to conventional accumulation mechanisms which require as many as 24 million instruction cycles to accumulate one million pixels. The above description is illustrative only and is not limiting. The present invention is limited only by the claims which follow.

TABLE A

| IC | LSU 48 | GRU28 | GRU 28 |
|---|---|---|---|
| 1 | read buffer weight | | |
| 2 | read frame weight | | |
| 3 | read buffer pixel | | |
| 4 | | | MUL8SUX16: buffer wt. × buffer pixel |
| 5 | | | MUL8ULX16: buffer wt. × buffer pixel |
| 6 | read subject pixel | FPADD16: wt'd buffer pixel | |
| 7 | read next buffer pixel | FPADD16: double wt'd buffer pixel | MUL8X16AL: frame wt. × subject pixel |
| 8 | | FPADD16: wt'd buffer pixel + wt'd subj. pixel | MUL8SUX16: buffer wt. × buffer pixel |
| 9 | store resulting destination pixel | | MUL8ULX16: buffer wt. × buffer pixel |
| 10 | read next subject pixel | FPADD16: wt'd buffer pixel | |
| 11 | read next buffer pixel | FFADD16: double wt'd buffer pixel | MUL8X16AL: frame wt. × subject pixel |
| 12 | | FPADD16: wt'd buffer pixel + wt'd subj. pixel | MUL8SUX16: buffer wt. × buffer pixel |
| 13 | store resulting destination pixel | | MUL8ULX16: buffer wt. × buffer pixel |
| 14 | read next subject pixel | FPADD16: wt'd buffer pixel | |
| 15 | | FPADD16: double wt'd buffer pixel | MUL8X16AL: frame wt. × subject pixel |
| 16 | | FPADD16: wt'd buffer pixel + wt'd subj. pixel | |
| 17 | store resulting destination pixel | | |

What is claimed is:

1. A method for accumulating a frame pixel, which has two or more components and which is stored in the memory of a computer system, with a buffer pixel, which has two or more components and which is stored in the memory the method comprising:

(a) multiplying, in a processor of the computer system which is operatively coupled to memory, each component of the buffer pixel by a buffer weight substantially simultaneously in a first partitioned multiplication operation to form in the memory a weighted buffer pixel, which has two or more weighted components wherein the first partitioned multiplication operation assumes during processing of the buffer weight that the buffer weight has a processing range from a processing minimum weight to a processing maximum weight;

multiplying, in the processor, each component of the frame pixel by a frame weight substantially simultaneously in a second partitioned multiplication operation to form in the memory a weighted frame pixel, which has two or more weighted components;

(c) summing, in the processor, each weighted component of the weighted buffer pixel with a respective weighted component of the weighted frame pixel substantially simultaneously in a partitioned addition operation to form an accumulated pixel having two or more accumulated components; and (d) adjusting the components of the weighted buffer pixel so as to extend the processing range of the buffer weight to effectively include at least an effective range between a minimum buffer weight which is different from the processing minimum weight and a maximum buffer weight which is different from the processing maximum weight.

2. The method of claim 1 wherein the step of adjusting comprises doubling the components of the weighted buffer pixel.

3. The method of claim 1 wherein the step of adjusting comprises adjusting the components of the weighted buffer pixel substantially simultaneously in a partitioned arithmetic operation of the processor.

4. The method of claim 1 wherein (i) the processing minimum weight is approximately −0.5; (ii) the processing maximum weight is approximately 0.5; (iii) the minimum buffer weight is approximately 0.0; and (iv) the maximum buffer weight is approximately 1.0.

5. A computer readable medium useful in association with a computer which includes a processor and a memory, the computer readable medium including computer instructions which are configured to cause the computer to accumulate a frame pixel, which has two or more components and which is stored in the memory of the computer system, with a buffer pixel, which has two or more components and which is stored in the memory, by performing the steps of (a) multiplying, in the processor of the computer system, each component of the buffer pixel by a buffer weight substantially simultaneously in a first partitioned multiplication operation to form in the memory a weighted buffer pixel, which has two or more weighted components wherein the first partitioned multiplication operation assumes during processing of the buffer weight that the buffer weight has a processing range from a processing minimum weight to a processing maximum weight;

(b) multiplying, in the processor, each component of the frame pixel by a frame weight substantially simultaneously in a second partitioned multiplication operation to form in the memory a weighted frame pixel, which has two or more weighted components;

(c) summing, in the processor, each weighted component of the weighted buffer pixel with a respective weighted component of the weighted frame pixel substantially simultaneously in a partitioned addition operation to form an accumulated pixel having two or more accumulated components; and (d) adjusting the components of the weighted buffer pixel so as to extend the processing range of the buffer weight to effectively include at least an effective range between a minimum buffer weight which is different from the processing minimum weight and a maximum buffer weight which is different from the processing maximum weight.

6. The computer readable medium of claim 5 wherein (i) the processing minimum weight is approximately −0.5; (ii) the processing maximum weight is approximately 0.5; (iii) the minimum buffer weight is approximately 0.0; and (iv) the maximum buffer weight is approximately 1.0.

7. The computer readable medium of claim 5 wherein the step of adjusting comprises doubling the components of the weighted buffer pixel.

8. The computer readable medium of claim 5 wherein the step of adjusting comprises adjusting the components of the weighted buffer pixel substantially simultaneously in a partitioned arithmetic operation of the processor.

9. A computer system comprising:

a processor;

a memory operatively coupled to the processor; and an accumulator which executes in the processor from the memory and which, when executed by the processor, causes the computer to accumulate a frame pixel, which has two or more components and which is stored in the memory of the computer system, with a buffer pixel, which has two or more components and which is stored in the memory, by performing the steps of:

(a) multiplying, in the processor of the computer system, each component of the buffer pixel by a buffer weight substantially simultaneously in a first partitioned multiplication operation to form in the memory a weighted buffer pixel, which has two or more weighted components wherein the first partitioned multiplication operation assumes during processing of the buffer weight that the buffer weight has a processing range from a processing minimum weight to a processing maximum weight;

(b) multiplying, in the processor, each component of the frame pixel by a frame weight substantially simultaneously in a second partitioned multiplication operation to form in the memory a weighted frame pixel, which has two or more weighted components;

(c) summing, in the processor, each weighted component of the weighted buffer pixel with a respective weighted component of the weighted frame pixel substantially simultaneously in a partitioned addition operation to form an accumulated pixel having two or more accumulated components; and (d) adjusting the components of the weighted buffer pixel so as to extend the processing range of the buffer weight to effectively include at least an effective range between a minimum buffer weight which is different from the processing minimum weight and a maximum buffer weight which is different from the processing maximum weight.

10. The computer system of claim 9 wherein (i) the processing minimum weight is approximately −0.5; (i) the processing maximum weight is approximately 0.5; (iii) the minimum buffer weight is approximately 0.0; and (iv) the maximum buffer weight is approximately 1.0.

11. The computer system of claim 9 wherein the step of adjusting comprises doubling the components of the weighted buffer pixel.

12. The computer system of claim 9 wherein the step of adjusting comprises adjusting the components of the weighted buffer pixel substantially simultaneously in a partitioned arithmetic operation of the processor.

13. An accumulator which executes in a processor of a computer system from a memory of the computer system and which, when executed by the processor, causes the computer to accumulate a frame pixel, which has two or more components and which is stored in the memory of the computer system, with a buffer pixel, which has two or more components and which is stored in the memory, by performing the steps of:

(a) multiplying, in the processor of the computer system, each component of the buffer pixel by a buffer weight substantially simultaneously in a first partitioned multiplication operation to form in the memory a weighted buffer pixel, which has two or more weighted components wherein the first partitioned multiplication operation assumes during processing of the buffer weight that the buffer weight has a processing range from a processing minimum weight to a processing maximum weight;

(b) multiplying, in the processor, each component of the frame pixel by a frame weight substantially simultaneously in a second partitioned multiplication operation to form in the memory a weighted frame pixel, which has two or more weighted components;

(c) summing, in the processor, each weighted component of the weighted buffer pixel with a respective weighted component of the weighted frame pixel substantially simultaneously in a partitioned addition operation to form an accumulated pixel having two or more accumulated components; and (d) adjusting the components of the weighted buffer pixel so as to extend the processing range of the buffer weight to effectively include at least an effective range between a minimum buffer weight which is different from the processing minimum weight and a maximum buffer weight which is different from the processing maximum weight.

14. The accumulator of claim 13 wherein (i) the processing minimum weight is approximately −0.5; (ii) the processing maximum weight is approximately 0.5; (iii) the minimum buffer weight is approximately 0.0; and (iv) the maximum buffer weight is approximately 1.0.

15. The accumulator of claim 13 wherein the step of adjusting comprises doubling the components of the weighted buffer pixel.

16. The accumulator of claim 13 wherein the step of adjusting comprises adjusting the components of the weighted buffer pixel substantially simultaneously in a partitioned arithmetic operation of the processor.

* * * * *